Dec. 27, 1927. 1,653,906
J. F. HEINBOCKEL ET AL
AUTOMATIC FEED FOR FISH CLEANING MACHINES
Filed May 29, 1926  4 Sheets-Sheet 4

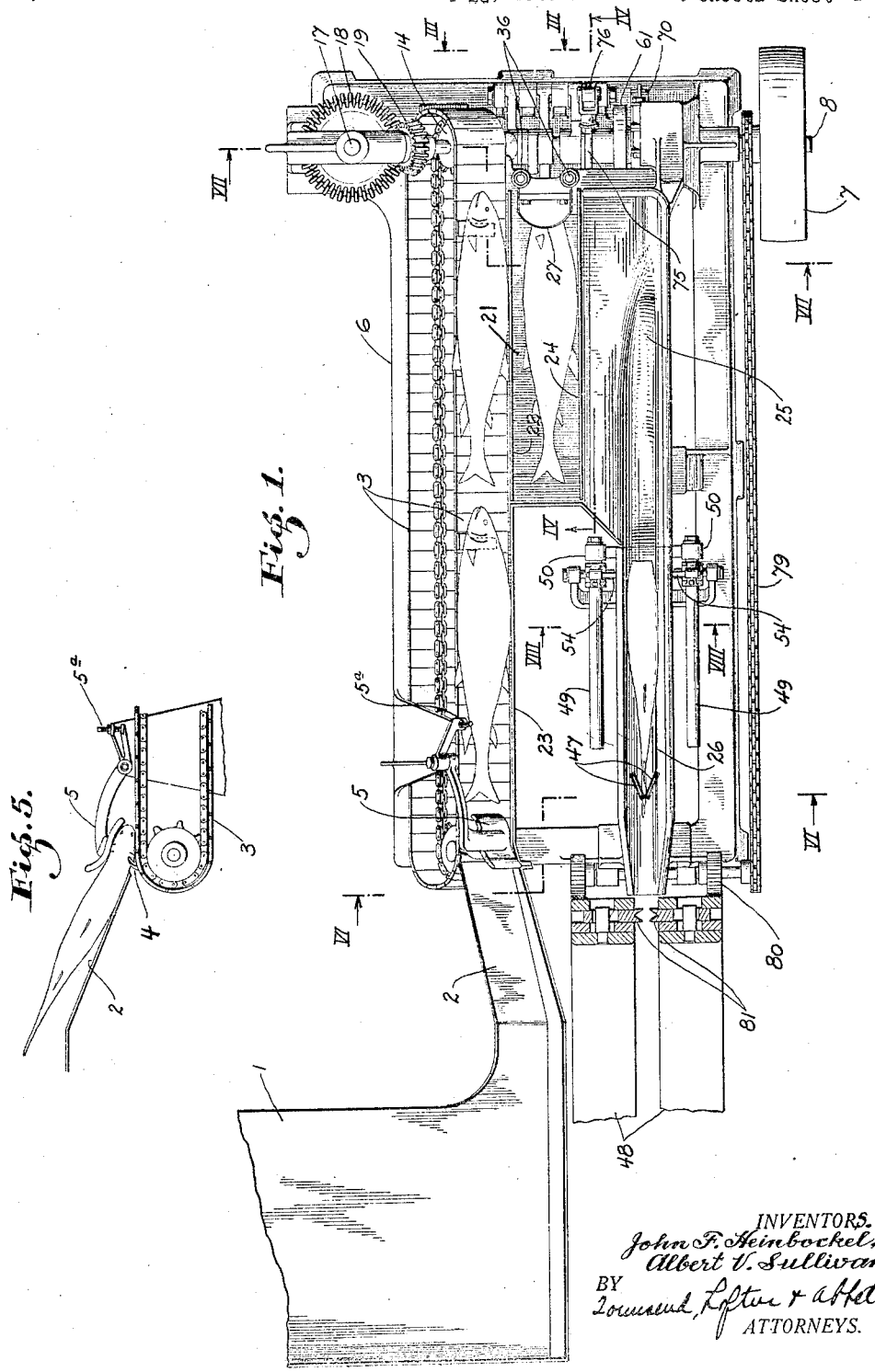

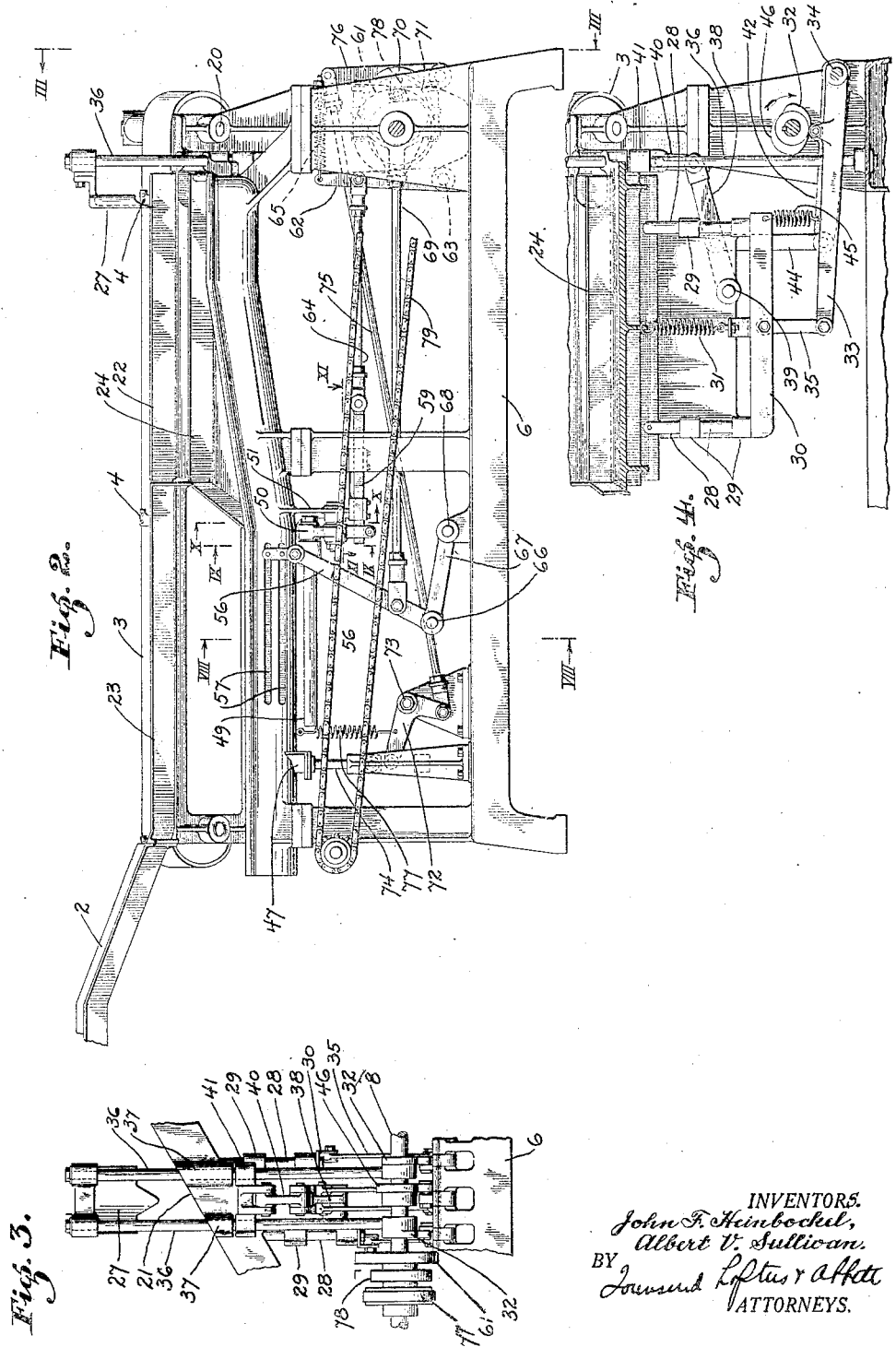

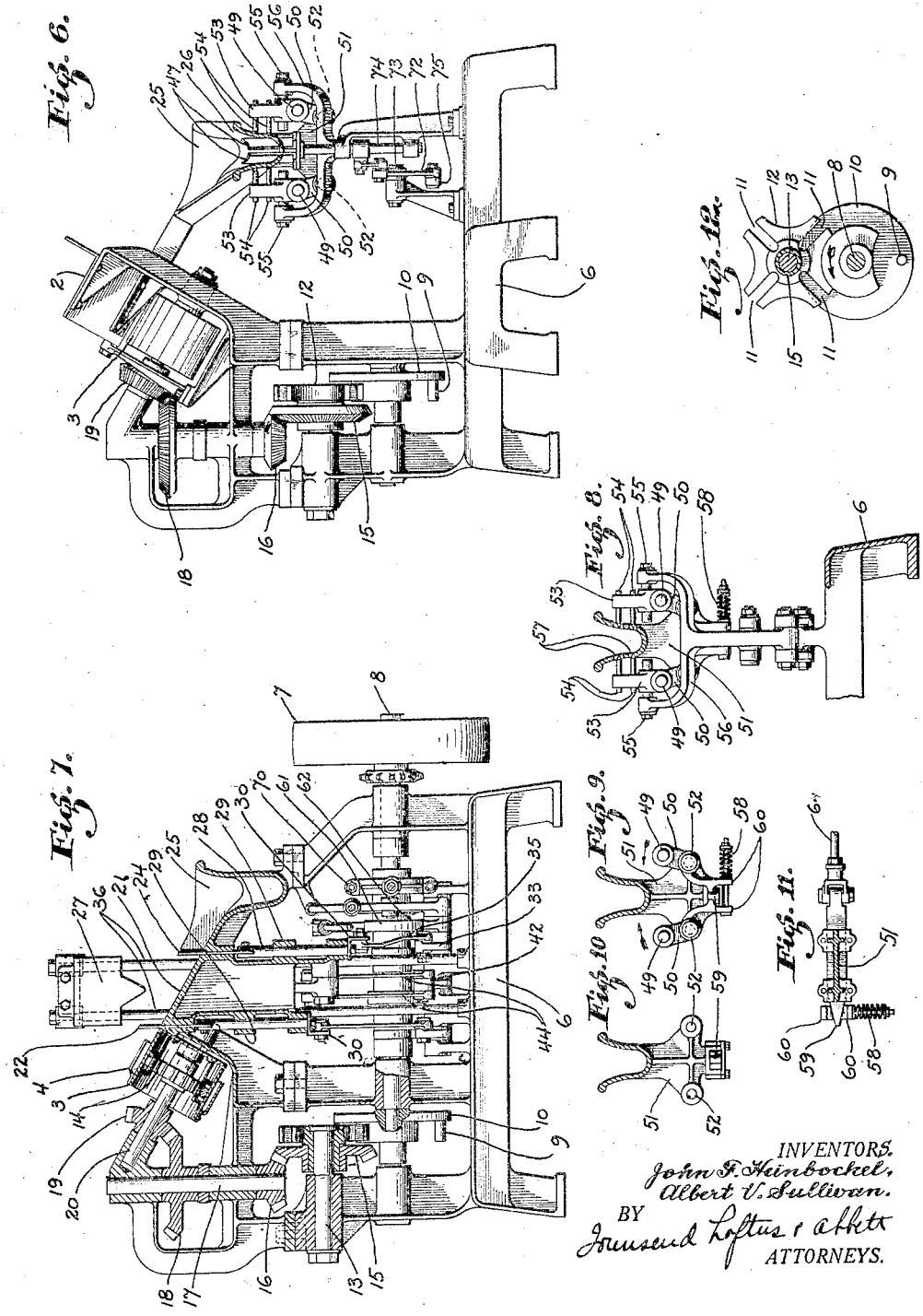

INVENTORS.
John F. Heinbockel,
Albert V. Sullivan.
BY
ATTORNEYS.

Patented Dec. 27, 1927.

1,653,906

UNITED STATES PATENT OFFICE.

JOHN F. HEINBOCKEL AND ALBERT V. SULLIVAN, OF SAN FRANCISCO, CALIFORNIA.

AUTOMATIC FEED FOR FISH-CLEANING MACHINES.

Application filed May 29, 1926. Serial No. 112,609.

This invention relates to fish cleaning machines and particularly to an improved automatic feeding and beheading mechanism therefor. In one well known form of fish cleaning machine, a large bull wheel is provided with several grippers spaced therearound. These grippers are each adapted to grip the tail of a fish and carry the same around to the several dressing and cleaning mechanisms which are located around the wheel at the periphery thereof. Heretofore, the fish have ordinarily been fed by hand to this wheel. It is an object of our invention to provide means for intermittently receiving fish successively from a hopper, severing the heads thereof, and thereafter feeding the fish to the said grippers in a manner whereby each gripper will successively receive and grip a fish and carry the same around to the dressing and cleaning mechanisms.

In the accompanying drawings, we have illustrated certain specific mechanism embodying our invention, but it will be understood that the invention can be otherwise embodied and that the drawings are not to be construed as defining or limiting the scope of the invention, the claims appended to this specification being relied upon for that purpose.

Referring to the figures of the accompanying drawings:

Figure 1 is a plan view of one embodiment of our invention.

Figure 2 is a side elevation thereof.

Figure 3 is a fragmentary end view showing the beheading mechanism.

Figure 4 is a fragmentary sectional view taken on line IV—IV of Fig. 1.

Figure 5 is a fragmentary detail view of the endless conveyor mechanism.

Figure 6 is a sectional view taken on line VI—VI of Fig. 1.

Fig. 7 is a sectional view taken on line VII—VII of Fig. 1.

Figs. 8 to 11 are detail sectional views taken on lines VIII to XI inclusive of Figs. 1 and 2.

Fig. 12 is a detail view of the intermittent driving mechanism.

Figure 14:
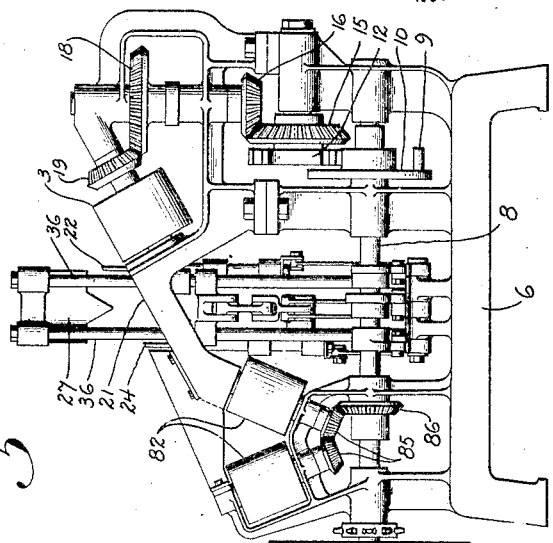
Fig. 14 is an end view of Fig. 13.

In the drawings, 1 indicates a fish hopper and 2 a chute therefrom to the cleaning machine. The chute is adapted to deliver the fish to one end of an endless conveyor 3 which carries a plurality of uniformly spaced hooks 4 for engaging in the gills of the fish. A pivoted member 5 is adapted to receive the head of each fish as it slides down the chute and to hold the same in a position to be engaged by the next hook as shown in Fig. 5. The position of the member 5 can be adjusted by a threaded stop pin 5ᵃ. The conveyor and its cooperating mechanism comprising our invention, are mounted on a supporting frame 6.

The conveyor 3, and preferably the parts cooperating therewith, may be driven from a pulley 7 on a shaft 8. The conveyor is driven intermittently from this shaft through the following connections, including the Geneva drive shown in Fig. 12. A pin 9 on a disk 10 is adapted to engage in four notches 11 of a disk 12 loose on a fixed shaft 13. The disk and a gear 15 thereon are thereby intermittently rotated 90° at each rotation of the shaft 8. The gear 15 is connected to the driving wheel 14 of the conveyor through bevel gear 16, shaft 17, bevel gears 18 and 19, and shaft 20.

As will be noted, the conveyor 3 is mounted in a laterally inclined position. A support 21 is provided laterally adjacent the lower side of the conveyor at a position removed from the feeding chute 2. A gate 22 prevents the fish from sliding off the conveyor onto the support 21 and a wall 23 prevents the fish from sliding off the conveyor before they reach this position. A second gate 24 prevents the fish from sliding off the support 21 into a chute 25 and downwardly into a trough 26. These gates are operated from the shaft 8 in synchronism with the conveyor 3 and a beheading knife 27.

As illustrated best in Figs. 4 and 7, each gate (22 and 24) is mounted on a pair of vertically movable rods 28 sliding in guides 29 and connected together at their lower ends by a bar 30. A spring 31 normally holds the gate in its upward position. The gate is intermittently drawn downward by a cam 32 on the shaft 8 engaging a roller on a lever 33 pivoted at 34 and having its free end connected by a link 35 to the bar 30. It will be understood that two such mechanisms are provided for respectively operating the two gates.

The beheading knife 27 is mounted on the upper ends of two rods 36 vertically slidable in guides 37. A lever 38 pivoted at 39, has its free end connected by a link 40 to a cross head 41 secured to the rods. A lever 42 pivoted at 34 has its free end connected to the lever 38 by a pair of links 44. A spring 45 connected to the lever 42 normally keeps the beheading knife in its raised position. A cam 46 on the shaft 8 engages a roller on the lever 42 and intermittently moves the beheading knife downwardly.

When the gate 24 is lowered, the beheaded fish slides into the chute 25 and trough 26, both of which are inclined downwardly. At the end of this movement, the fish has automatically assumed the position shown in Fig. 1, wherein its tail projects a short distance through a pair of spaced gates 47. A second conveyor mechanism now operates to carry the beheaded fish to the dressing wheel 48.

A pair of parallel rods 49, which are also parallel with the trough 26, are carried on the free ends of two levers 50 pivoted on a bracket 51 at 52. A pair of carriers 53 each having two inwardly projecting pins 54, are slidably mounted on the rods 49 and also on a pair of relatively right angular rods 55 carried by a yoke 56. The pins 54 are in alignment with slots 57 extending through and longitudinally of the trough 26. A spring 58 normally holds the carriers in the outer position illustrated in Fig. 8. A sliding wedge 59 is adapted to spread the ends 60 of the levers 50 in a manner forcing the pins inwardly to engage the fish in the trough.

The wedge 59 is operated by a cam 61 on the shaft 8 engaging a lever 62 pivoted at 63 and connected to the wedge by a rod 64. A spring 65 holds the lever against the cam.

The yoke 56 is pivoted at 66 to a link 67 pivoted at 68. The yoke is oscillated about its pivot 66 by a rod 69 connected to a member 70 engaging an eccentric 71 on the shaft 8.

One arm of a bell crank 72 pivoted at 73 is connected to the gates 47 by a rod 74. The other arm is connected by a rod 75 to a lever 76. A spring 77 normally holds the gate in the upward position and a cam 78 on the shaft 8 moves the gates downwardly against the action of the spring.

The dressing wheel 48 is driven from the shaft 8 through a chain 79 and suitable gearing 80. One of the fish grippers 81 on the dressing wheel is illustrated in Fig. 1.

Briefly, the operation of the improved machine comprising our invention is substantially as follows:

The several parts of the machine are driven from the shaft 8 and are therefore operated in synchronism. The fish are guided from the hopper 1 down the chute 2 head foremost. The head of each fish enters beneath the member 5 and at the next intermittent movement of the conveyor 3, a hook 4 engages in the gill and moves the fish along therewith. This movement is slightly greater than the length of the fish, whereby the fish is carried just beyond the member 5. Upon the next movement of the conveyor, the fish is carried to a position opposite to the support 21.

At each pause in the conveyor movement, gate 22 is lowered and the adjacent fish on the conveyor slides onto the support 21, the hook 4 being so positioned that the fish slides to the proper position beneath the beheading knife 27. The knife thereafter operates to behead the fish. The gate 24 is then lowered and the beheaded fish slides to the position shown in Fig. 1, with its tail projecting slightly between the spaced gates 47.

The cam 61 thereafter operates the wedge 59 to force the rods 49 toward each other and the pins 54 into engagement with the fish. The cam 67 then lowers the gates 47 and the eccentric 71 moves the yoke 56 forwardly to a position, placing the tail portion of the fish between the grippers 81. These grippers thereupon engage the fish and the wheel 48 is rotated to carry the fish to the cleaning mechanism and to present an empty pair of grippers to the trough 26. As has been heretofore stated, all these operations are performed from the shaft 8 and in proper timed relation to carry on the operation continuously and simultaneously.

Figure 13:
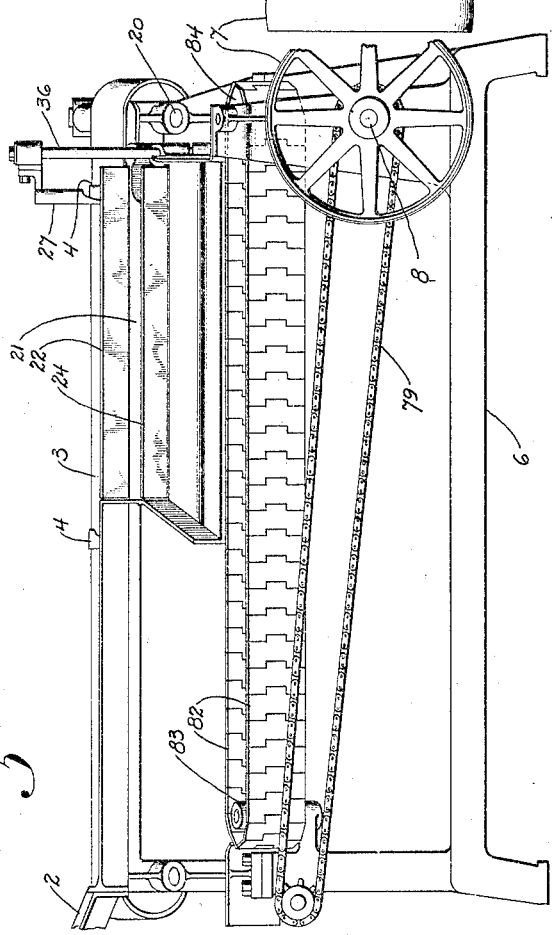
Fig. 13 is a view like Fig. 2, but showing a modification of our invention.

The mechanism shown in Figs. 13 and 14 is the same as that just described, except that a double belt conveyor is substituted for the reciprocating conveyor, which carries the beheaded fish to the dressing wheel 48. This conveyor comprises a pair of belts 82 relatively arranged to form a trough therebetween and running over end pulleys 83 and 84. The belts are driven from the shaft 8 by bevel gears 85 and 86. It will be seen that after the fish is beheaded and the gate 24 lowers, the beheaded fish slides into the trough formed between the belts 82 and is carried to the dressing wheel 48 in the manner above described.

Having thus described our invention, what we claim is:

1. In a fish dressing machine, the combination of a conveyor adapted to receive and intermittently carry fish one at a time successively to a definite position on the machine, means whereby said fish is transferred to a second and stationary position, means for holding the fish in said position, a beheader for automatically beheading said fish while in said second position, means for releasing said fish from said second position after the beheading operation, a conveyor for receiving said beheaded fish and conveying the same out of the machine, and means whereby the operation of the above conveyors and beheading means are so timed that the fish is automatically fed into the machine, beheaded and discharged therefrom.

2. In a fish dressing machine, the combination of an endless conveyor, a chute adjacent one end thereof, a plurality of hooks carried in spaced relation by the conveyor, the chute being adapted to guide fish onto the conveyor where the hooks respectively engage in the gills of the fish and carry the same along therewith, a support laterally adjacent another portion of the conveyor, means intermittently operating the conveyor, means whereby a fish on the conveyor adjacent the said support moves onto the support during each pause in the conveyor movement, means for severing the head of each fish while on the support, and intermittently operating means for moving each fish after the beheading thereof to a definite position where the same is engaged by a cleaning mechanism.

3. In a fish dressing machine, the combination of an endless conveyor, a chute adjacent one end thereof, a plurality of hooks carried in uniformly spaced relation by the conveyor, the chute being adapted to guide the fish onto the conveyor where the hooks respectively engage in the gills of the fish and carry the same along therewith, a support laterally adjacent another portion of the conveyor, means whereby a fish on the conveyor adjacent the said support moves onto the support during each pause in the conveyor movement, means for severing the head of such fish while on the support, means for gripping and conveying each fish after the beheading thereof to a definite position on the machine, and means for intermittently operating the conveyor, beheader, the gripping and conveying means in synchronism whereby a fish is mechanically and automatically passed through the machine.

4. In a fish dressing machine, the combination of a laterally inclined endless conveyor, a chute adjacent one end thereof, a plurality of hooks carried in spaced relation by the conveyor, the chute being adapted to guide fish onto the conveyor where the hooks respectively engage in the gills of the fish and carry the same along therewith, a support laterally adjacent another portion of the conveyor on the lower side thereof, means intermittently operating the conveyor, a gate between the conveyor and the said support, means for intermittently moving the gate at each pause in the conveyor movement to permit a fish on the conveyor to slide onto the support, means for severing the head of such fish while on the support, and intermittently operating means for moving each fish after the beheading thereof to a definite position where the same is engaged by a cleaning mechanism.

5. In a fish dressing machine, the combination of a laterally inclined endless conveyor, a chute adjacent one end thereof, a plurality of hooks carried in uniformly spaced relation by the conveyor, the chute being adapted to guide fish onto the conveyor where the hooks respectively engage in the gills of the fish and carry the same along therewith, a support laterally adjacent another portion of the conveyor on the lower side thereof, means intermittently operating the conveyor, a vertically movable gate between the conveyor and the said support, means for intermittently moving the gate vertically at each pause in the conveyor movement to permit a fish on the conveyor to slide onto the support, means for severing the head of such fish while on the support, and intermittently operating means for moving each fish after the beheading thereof to a definite position where the same is engaged by a cleaning mechanism.

6. In a fish dressing machine, the combination of a conveyor, a chute adjacent one end thereof, a plurality of hooks carried in spaced relation by the conveyor, the chute being adapted to guide fish onto the conveyor where the hooks respectively engage in the gills of the fish and carry the same along therewith, a support laterally adjacent another portion of the conveyor, means intermittently operating the conveyor, means whereby a fish on the conveyor adjacent the said support moves onto the support during each pause in the conveyor movement, means for severing the head of each fish while on the support, and conveyor means for moving each fish after the beheading thereof to a definite position where the same is engaged by a cleaning mechanism.

7. In a fish dressing machine, the combination of a conveyor adapted to receive and intermittently carry fish one at a time successively to a definite position on the machine, a double belt conveyor adapted to receive and intermittently carry the same fish one at a time successively to another definite position on the machine, a beheader for automatically beheading the fish intermediate the two conveyors, and means for operating the conveyors and beheader in synchronism, whereby a fish is automatically passed through the machine.

JOHN F. HEINBOCKEL.
ALBERT V. SULLIVAN.